(12) United States Patent
O'Shea et al.

(10) Patent No.: US 10,417,161 B2
(45) Date of Patent: Sep. 17, 2019

(54) EFFICIENT TECHNIQUE FOR COMMUNICATING BETWEEN DEVICES OVER A MULTI-DROP BUS

(71) Applicant: QUALCOMM Incorporated, San Diego, CA (US)

(72) Inventors: Helena Deirdre O'Shea, San Diego, CA (US); Lalan Jee Mishra, San Diego, CA (US); Amit Gil, Zichron Yaakov (IL); Gary Chang, San Jose, CA (US); Mohit Kishore Prasad, San Diego, CA (US); Richard Dominic Wietfeldt, San Diego, CA (US); Vinay Jain, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/219,698

(22) Filed: Dec. 13, 2018

(65) Prior Publication Data

US 2019/0236042 A1 Aug. 1, 2019

(30) Foreign Application Priority Data

Jan. 26, 2018 (IN) .............................. 201841003135

(51) Int. Cl.
```
G06F 13/36      (2006.01)
G06F 13/40      (2006.01)
G06F 13/42      (2006.01)
```
(52) U.S. Cl.
CPC ........ *G06F 13/404* (2013.01); *G06F 13/4022* (2013.01); *G06F 13/4031* (2013.01); *G06F 13/4291* (2013.01); *G06F 2213/0052* (2013.01); *G06F 2213/36* (2013.01)

(58) Field of Classification Search
None
See application file for complete search history.

(56) References Cited

U.S. PATENT DOCUMENTS

| 7,808,995 B2* | 10/2010 | Kuo ........................ H04L 69/22 370/392 |
| 8,984,249 B2* | 3/2015 | Pyeon ................. G06F 13/4291 710/105 |
| 10,049,065 B2* | 8/2018 | Ham ................. H04L 12/40143 |

(Continued)

OTHER PUBLICATIONS

International Search Report and Written Opinion—PCT/US2018/065654—ISA/EPO—dated Mar. 7, 2019.

*Primary Examiner* — Cheng Yuan Tseng
(74) *Attorney, Agent, or Firm* — Loza & Loza LLP

(57) ABSTRACT

In a device comprising a serial bus and a plurality of devices, register/address mappings and/or unique group identifiers are used to convey additional information in messages/datagrams over the serial bus without explicitly sending such information in the message/datagram. Such register/address mappings may be done beforehand, and in conjunction with group-specific identifiers, may reduce transmission latency by keeping the size of the messages/datagrams small. Since all devices on the serial bus have prior knowledge of such register/address mappings and/or group-specific identifiers, recipient devices are able to infer information from the group-specific identifiers and/or register/address sent in each message/datagram that is not explicitly sent within such message/datagram.

23 Claims, 10 Drawing Sheets

(56) References Cited

U.S. PATENT DOCUMENTS

| | | |
|---|---|---|
| 10,285,051 B2 * | 5/2019 | Alfred .................... H04L 9/088 |
| 2015/0339248 A1 | 11/2015 | Choi |
| 2017/0115987 A1 | 4/2017 | Peixoto Machado Da Silva et al. |
| 2017/0277651 A1 | 9/2017 | Ngo et al. |

* cited by examiner

EFFICIENT TECHNIQUE FOR COMMUNICATING BETWEEN DEVICES OVER A MULTI-DROP BUS

CLAIM OF PRIORITY

The present application for patent claims priority to Indian Patent Application No. 201841003135 entitled "Efficient Technique for Communicating Between Devices Over A Multi-Drop Bus" filed Jan. 26, 2018, the entire disclosure of which is hereby expressly incorporated by reference.

TECHNICAL FIELD

The present disclosure relates generally to serial communication over a multi-drop bus and, more particularly, for a technique by which to identify a sender of a datagram over a multi-drop bus without explicitly including a sender address/identifier in the datagram.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a serial bus or a parallel bus. General-purpose serial interfaces known in the industry, including the Inter-Integrated Circuit (I2C or I²C) serial bus and its derivatives and alternatives, including interfaces defined by the Mobile Industry Processor Interface (MIPI) Alliance, such as the I3C interface, the system power management interface (SPMI), and the Radio Frequency Front-End (RFFE) interface.

In one example, the I2C serial bus is a serial single-ended computer bus that was intended for use in connecting low-speed peripherals to a processor. Some interfaces provide multi-master busses in which two or more devices can serve as a bus master for different messages transmitted on the serial bus. In another example, the RFFE interface defines a communication interface for controlling various radio frequency (RF) front-end devices, including power amplifier (PA), low-noise amplifiers (LNAs), antenna tuners, filters, sensors, power management devices, switches, etc. These devices may be collocated in a single integrated circuit (IC) device, or provided in multiple IC devices. In a mobile communications device, multiple antennas and radio transceivers may support multiple concurrent RF links.

Systems with a multi-drop serial bus may require interconnected devices to be able to communicate with each other in a consistent manner such that a message/datagram from one device can be sent to one or more other devices on the serial bus concurrently while the one or more other receiving devices need to know the originator of the message/datagram. As the devices on such multi-drop buses use a common limited protocol to exchange messages, embedding source/sender identifier bits to identify the originator is expensive in terms of resources, power, and latency. Therefore, there is a need for an efficient way to convey sender identity over a multi-drop bus.

SUMMARY

A first aspect provides a communication method operational on a device coupled to a multi-drop serial bus. For each of a plurality of devices coupled to a serial bus, a plurality of unique group-specific identifiers is obtained, where each unique group-specific identifier identifies one or more of the devices coupled to the serial bus. A unit-specific identifier for each of the plurality of devices is mapped with its corresponding plurality of unique group-specific identifiers. The mappings of unit-specific identifiers to corresponding plurality of unique group-specific identifiers are transmitted to the plurality of devices coupled to the serial bus. A datagram is transmitted over the serial bus, the datagram including the group-specific identifier for the intended recipient device(s) but excluding an explicit sender device identifier.

A corresponding register/address space is mapped for each of a plurality of possible message types to be transmitted over the serial bus. The mappings/associations of message types to register/address spaces are transmitted to the plurality of devices coupled to the serial bus. As part of the datagram, a register/address space associated with the datagram type is transmitted but excluding an explicit message type. In one example, the serial bus may be a two line bus, including a clock line and a data line.

In one implementation, the device may perform an arbitration proceeding with other devices coupled to the serial bus to be able to transmit the datagram over the serial bus. For instance, the multi-drop serial bus may be a multi-master serial bus.

A second aspect provides a device, comprising: a serial communication bus interface to couple to a serial bus and a processing circuit. The processing circuit may be configured to: (a) obtain, for each of a plurality of devices coupled to the serial bus, a plurality of unique group-specific identifiers, where each unique group-specific identifier identifies one or more of the devices coupled to the serial bus; (b) map a unit-specific identifier for each of the plurality of devices with its corresponding plurality of unique group-specific identifiers; (c) transmit the mappings of unit-specific identifiers to corresponding plurality of unique group-specific identifiers to the plurality of devices coupled to the serial bus; (d) transmit a datagram over the serial bus, the datagram including the group-specific identifier for the intended recipient device(s) but excluding an explicit sender device identifier; (e) map a corresponding register/address space for each of a plurality of possible message types to be transmitted over the serial bus; (f) transmit the mappings/associations of message types to register/address spaces to the plurality of devices coupled to the serial bus; and/or (g) transmit, as part of the datagram, a register/address space associated with the datagram type but excluding an explicit message type.

A third aspect pertains to a processor-readable storage medium having instructions stored thereon which, when executed by at least one processor or state machine of a processing circuit, cause the processing circuit to: (a) obtain, for each of a plurality of devices coupled to a serial bus, a plurality of unique group-specific identifiers, where each unique group-specific identifier identifies one or more of the devices coupled to the serial bus; (b) map a unit-specific identifier for each of the plurality of devices with its corresponding plurality of unique group-specific identifiers; (c) transmit the mappings of unit-specific identifiers to corresponding plurality of unique group-specific identifiers to the plurality of devices coupled to the serial bus; (d) transmit a datagram over the serial bus, the datagram including the group-specific identifier for the intended recipient device(s) but excluding an explicit sender device identifier; (e) map a corresponding register/address space for each of a plurality of possible message types to be transmitted over the serial bus; (f) transmit the mappings/associations of message types to register/address spaces to the plurality of devices coupled to the serial bus; and/or (g) transmit, as part of the datagram, a register/address space associated with the datagram type but excluding an explicit message type.

A fourth aspect provides a communication method operational on a device coupled to a multi-drop serial bus. Mappings of unit-specific identifiers to a corresponding plurality of unique group-specific identifiers are received over the serial bus. A datagram is received over the serial bus, the datagram including a first group-specific identifier for the intended recipient device(s) but excluding an explicit sender device identifier. A sender device of the datagram is ascertained based on the first group-specific identifier and the mappings of unit-specific identifiers to corresponding plurality of unique group-specific identifiers.

A plurality of mappings/associations of message types to register/address spaces may be received over the serial bus. As part of the datagram, a first register/address space associated with the datagram type but excluding an explicit message type may be received. A message type of the datagram may be ascertained based on the first register/address space and the plurality of mappings/associations of message types to register/address spaces. The serial bus may be a two line bus, including a clock line and a data line.

A fifth aspect provides a device, comprising: a serial communication bus interface to couple to a serial bus; and a processing circuit. The processing circuit may be configured to: (a) receive mappings of unit-specific identifiers to a corresponding plurality of unique group-specific identifiers over the serial bus; (b) receive a datagram over the serial bus, the datagram including a first group-specific identifier for the intended recipient device(s) but excluding an explicit sender device identifier; (c) ascertain a sender device of the datagram based on the first group-specific identifier and the mappings of unit-specific identifiers to corresponding plurality of unique group-specific identifiers; (d) receive a plurality of mappings/associations of message types to register/address spaces over the serial bus; (e) receive, as part of the datagram, a first register/address space associated with the datagram type but excluding an explicit message type; and/or (f) ascertain a message type of the datagram based on the first register/address space and the plurality of mappings/associations of message types to register/address spaces.

A sixth aspect provides a processor-readable storage medium having instructions stored thereon which, when executed by at least one processor or state machine of a processing circuit, cause the processing circuit to: (a) receive mappings of unit-specific identifiers to a corresponding plurality of unique group-specific identifiers over the serial bus; (b) receive a datagram over the serial bus, the datagram including a first group-specific identifier for the intended recipient device(s) but excluding an explicit sender device identifier; (c) ascertain a sender device of the datagram based on the first group-specific identifier and the mappings of unit-specific identifiers to corresponding plurality of unique group-specific identifiers; (d) receive a plurality of mappings/associations of message types to register/address spaces over the serial bus; (e) receive, as part of the datagram, a first register/address space associated with the datagram type but excluding an explicit message type; and/or (f) ascertain a message type of the datagram based on the first register/address space and the plurality of mappings/associations of message types to register/address spaces.

A seventh aspect provides a communication method operational on a first device coupled to a multi-drop serial bus. A plurality of unique group-specific identifiers is obtained, where each unique group-specific identifier identifies two or more of a plurality of devices coupled to a serial bus. The plurality of unique group-specific identifiers may be transmitted to the plurality of devices coupled to the serial bus. A corresponding and non-overlapping register/address space is mapped for each of the plurality of devices and for each of a plurality of possible message types to be transmitted over the serial bus. The mappings/associations of non-overlapping register/address spaces for message types and devices are transmitted to the plurality of devices coupled to the serial bus. A datagram is transmitted over the serial bus, the datagram including the group-specific identifier for the intended recipient devices and a first register/address within an address space associated with the first device and the message type for the datagram. Two or more distinct register/address space segments, with additional information to be conveyed to intended recipient devices, are mapped for each corresponding and non-overlapping register/address space associated with a particular message type. The mappings of two or more distinct register/address space segments are transmitted with additional information to the plurality of devices coupled to the serial bus.

An eight aspect provides a device, comprising: a serial communication bus interface to couple to a serial bus; and a processing circuit. The processing circuit may be configured to: (a) obtain a plurality of unique group-specific identifiers, where each unique group-specific identifier identifies two or more of a plurality of devices coupled to a serial bus; (b) transmit the plurality of unique group-specific identifiers to the plurality of devices coupled to the serial bus; (c) map a corresponding and non-overlapping register/address space for each of the plurality of devices and for each of a plurality of possible message types to be transmitted over the serial bus; (d) transmit the mappings/associations of non-overlapping register/address spaces for message types and devices to the plurality of devices coupled to the serial bus; (e) transmit a datagram over the serial bus, the datagram including the group-specific identifier for the intended recipient devices and a first register/address within an address space associated with the first device and the message type for the datagram; (f) map two or more distinct register/address space segments, with additional information to be conveyed to intended recipient devices, for each corresponding and non-overlapping register/address space associated with a particular message type; and/or (g) transmit the mappings of two or more distinct register/address space segments with additional information to the plurality of devices coupled to the serial bus.

A ninth aspect provides a processor-readable storage medium having instructions stored thereon which, when executed by at least one processor or state machine of a processing circuit, cause the processing circuit to: (a) obtain a plurality of unique group-specific identifiers, where each unique group-specific identifier identifies two or more of a plurality of devices coupled to a serial bus; (b) transmit the plurality of unique group-specific identifiers to the plurality of devices coupled to the serial bus; (c) map a corresponding and non-overlapping register/address space for each of the plurality of devices and for each of a plurality of possible message types to be transmitted over the serial bus; (d) transmit the mappings/associations of non-overlapping register/address spaces for message types and devices to the plurality of devices coupled to the serial bus; and/or (e) transmit a datagram over the serial bus, the datagram including the group-specific identifier for the intended recipient devices and a first register/address within an address space associated with the first device and the message type for the datagram.

A tenth aspect provides a communication method operational on a device coupled to a multi-drop serial bus. A plurality of unique group-specific identifiers are received, where each unique group-specific identifier identifies two or more of a plurality of devices coupled to a serial bus. A plurality of mappings/associations of non-overlapping register/address spaces to message types and devices coupled to the serial bus are also received. A datagram is received over the serial bus, the datagram including the group-specific identifier for the intended recipient device(s) and a first register/address. A sender device and message type of the datagram is ascertained based on the first register/address and the mappings/associations of non-overlapping register/address spaces. Mappings/associations of two or more distinct register/address space segments, within one or more of the non-overlapping register/address spaces, are received with additional information. Additional information ascertained based on the first register address and mappings/associations of two or more distinct register/address space segments.

An eleventh aspect provides a device, comprising: a serial communication bus interface to couple to a serial bus; and a processing circuit. The processing circuit may be configured to: (a) receive a plurality of unique group-specific identifiers, where each unique group-specific identifier identifies two or more of a plurality of devices coupled to a serial bus; (b) receive a plurality of mappings/associations of non-overlapping register/address spaces to message types and devices coupled to the serial bus; (c) receive a datagram over the serial bus, the datagram including the group-specific identifier for the intended recipient device(s) and a first register/address; (d) ascertain a sender device and message type of the datagram based on the first register/address and the mappings/associations of non-overlapping register/address spaces; (e) receive mappings/associations of two or more distinct register/address space segments, within one or more of the non-overlapping register/address spaces, with additional information; and/or (f) ascertain additional information based on the first register address and mappings/associations of two or more distinct register/address space segments.

A twelfth aspect provides a processor-readable storage medium having instructions stored thereon which, when executed by at least one processor or state machine of a processing circuit, cause the processing circuit to: (a) receive a plurality of unique group-specific identifiers, where each unique group-specific identifier identifies two or more of a plurality of devices coupled to a serial bus; (b) receive a plurality of mappings/associations of non-overlapping register/address spaces to message types and devices coupled to the serial bus; (c) receive a datagram over the serial bus, the datagram including the group-specific identifier for the intended recipient device(s) and a first register/address; and/or (d) ascertain a sender device and message type of the datagram based on the first register/address and the mappings/associations of non-overlapping register/address spaces.

DETAILED DESCRIPTION

Figure 1:
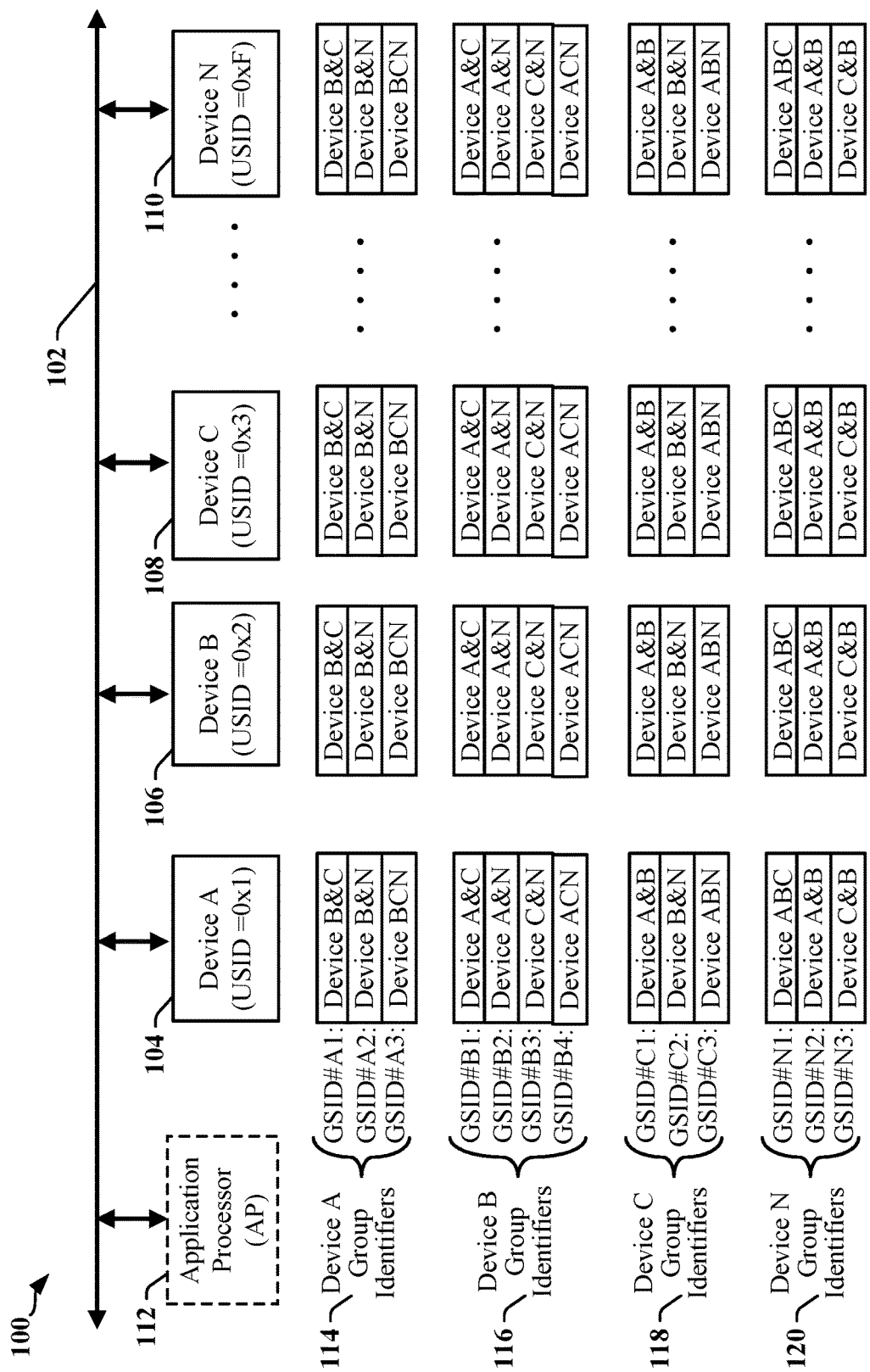
FIG. 1 illustrates an exemplary device including a multi-drop serial bus and a plurality of devices coupled thereto.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

A first aspect provides for identifying a sender/originator device of a message/datagram over a multi-drop serial bus without explicitly including a sender/originator device address/identifier in the message/datagram. The serial bus may have multiple devices, a plurality of which may alternate or switch turns as master device. An arbitration scheme (e.g., through interrupts over the serial bus or other means) may allow one of the devices to transmit a message/datagram over the serial bus to one or more other devices. A set of unique group-specific identifiers are associated/assigned to each device on the serial bus. The sets of unique group-specific identifiers are then distributed to all devices. A sender/originator device uses one of its unique group-specific identifiers as a recipient/destination device identifier in a message/datagram. The recipient/destination device(s) is able to inherently identify the sender/originator of the message/datagram based on its mappings of unique group-specific identifiers to devices.

A second aspect provides for a way to identify a message type without explicitly including a message type or identifier in the message/datagram transmitted over the serial bus. The message types are mapped to non-overlapping register/address spaces. This message type to register/address space mapping is then distributed to all devices coupled to the serial bus. A sender/originator device specifies the register/address space in a message/datagram transmitted over serial bus to inherently specify the message type. The recipient devices all have the same mapping, therefore can identify the message type. Identifying the different message types by their address frees up, for example, 3 bits in a payload to convey more useful information.

Exemplary Multi-Bus Operating Environment and Methods Implemented Thereon

FIG. 1 illustrates an exemplary device 100 including a multi-drop serial bus and a plurality of devices coupled thereto. The multi-drop bus 102 may be a serial communications bus having, for example, two lines (e.g., a clock line and a data line). A plurality of devices, 104, 106, 108, and 110 may be coupled to the bus and may be configurable to operate as either a master device or a slave device when communicating over the multi-drop bus 102. Each device 104, 106, 108, and 110 may have a corresponding unit-specific identifier (USID) that may serve to identify and/or address such device over the bus 102. In various implementations, the multi-drop bus 102 may serve to implement I2C, I3C, SPMI, and/or RFFE signaling and/or communications between the plurality of devices 104, 106, 108, and/or 110. In some implementations, some of the devices 104, 106, 108, and 110 maybe request-capable slave devices that are able to request use of the bus 102 to initiate transmissions.

An application processor 112 may manage, control, and/or communicate with the plurality of devices 104, 106, 108, 110 over the multi-drop bus 102.

According to various examples, the devices 104, 106, 108, and 110 may include various one or more radios, such as third generation (3G), fourth generation (4G) and/or fifth generation (5G) radio/modems for voice and data, an IEEE 802.11 (WiFi) radio, a Global Positioning System (GPS) radio, a Bluetooth radio, and/or a near field communications (NFC) radio, etc.

An arbitration process may determine which device (e.g., the master device) sends information over the multi-drop bus 102 at any point in time. The other devices (e.g., the slave devices) listen for the data they are intended to receive over the multi-drop bus 102.

However, existing multi-drop serial bus architectures (e.g., I2C, I3C, SPMI, RFFE) do not convey the sender (originating) device's identity in transmission of messages, instead a receiver (destination) identifier is marked in a transmitted datagram. As a result, once a device wins arbitration and starts transmitting over the multi-drop bus 102, there is no way by which the receiving device(s) to know which device is sending the datagram. Not knowing the sender (originating) devices identity creates a big challenge in terms of subsequent information processing.

One approach provides for using unique group identifiers that inherently identify a message/datagram as originating from a particular sender device. For each device capable of sending information over the bus 102, a unique identifier is generated that identifies two or more devices on the bus 102 that are the intended recipients of a message. For instance, for a first device A 104, three unique group-specific identifiers GSID#A1, GSID#A2, and GSID#A3 114 are defined and distributed to all devices on the bus 102. Each of the of the unique group-specific identifiers GSID#A1, GSID#A2, and GSID#A3 may be associated with a different/distinct combination of intended recipient devices. Similarly, distinct unique group-specific identifiers 116, 118, and 120 are defined for other devices on the bus 102 and distributed to all devices on the bus 102. Such mappings of sender/originator device to unique group-specific identifiers 114, 116, 118, and 120 may be distributed upon initialization, power-up, and/or reset of the device 100 or they may be distributed by a master device on the bus 102. Note that, in some implementations, the unique group-specific identifiers 114, 116, 118, and 120 may be dynamically generated and reconfigured by a master device and redistributed to all devices on the bus 102.

A message/datagram transmitted over the bus 102 may use, for example, a 4-bit identifier field to identify the recipient device but no identifier field may be defined to identify the sender device. The sender device may thus send one of its unique group identifiers to inherently notify a recipient whether it is an intended recipient and to inherently identify the sender device (e.g., identified by its unit-specific identifier). For instance, if the first device 104 intends to send a message/datagram to devices B 106 and N 110, then it may send GSID#A2 in the 4-bit identifier field to identify the intended recipient(s). Upon receipt of the message/datagram over the bus 102, each of the devices 106, 108, 110 may determine whether it is an intended recipient and inherently ascertain the sender device (e.g., by knowing beforehand that the unique group identifier GSID#A2 corresponds to sender device A 104). Such mapping may map a device's unit-specific identifier (USID) to group-specific identifiers.

Another aspect provides for inherently identifying a message type based on an address field in the transmitted message/datagram. To reduce latency, rather than using additional bits in a message/datagram to identify a message type, an address field (e.g., 16-bit address field) in the transmission/datagram may be used to map a message type to an address or address range.

Figure 2:
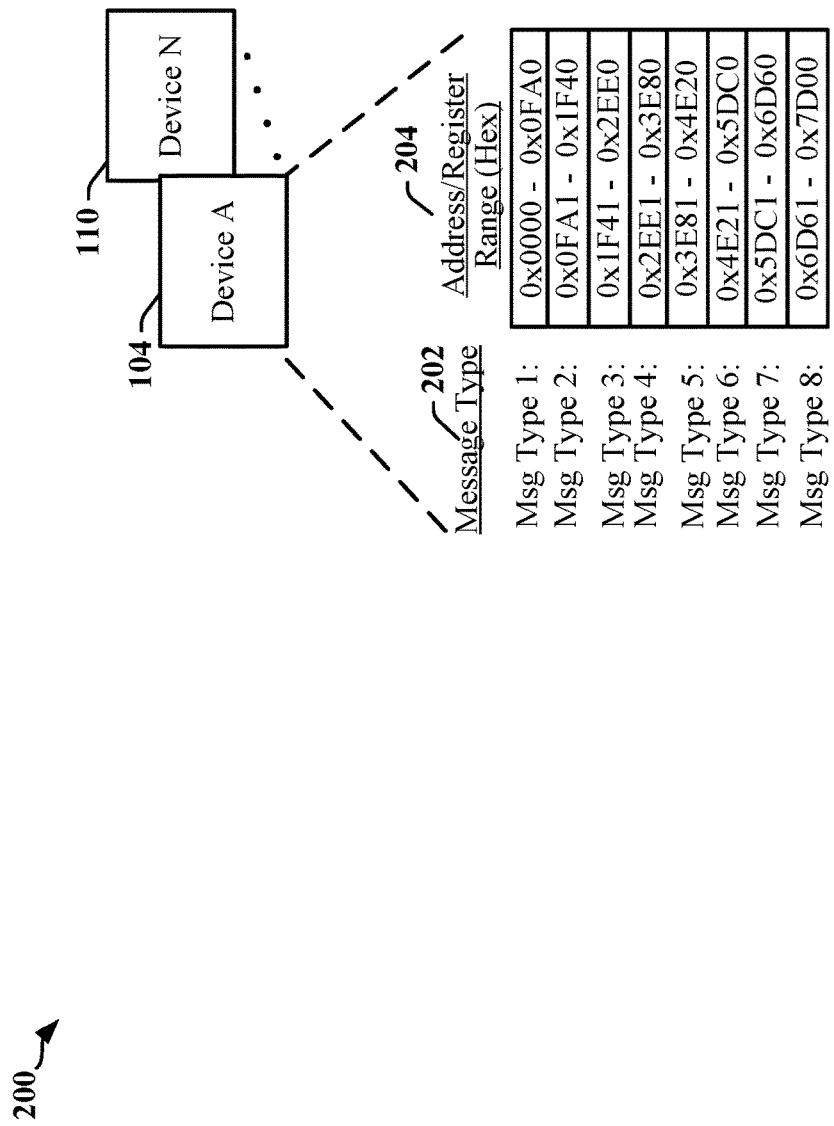
FIG. 2 illustrates an exemplary mapping of message type to address range which may be distributed and used by devices on the bus to implicitly identify a message type without having to explicitly send a message type as part of the message or datagram.

FIG. 2 illustrates an exemplary mapping of message type to address range which may be distributed and used by devices on the bus 102 to implicitly identify a message type without having to explicitly send a message type as part of the message or datagram. A mapping of message type 202 to address range(s) 204 may be distributed across all devices 104, 110 coupled to the bus 102 so that the message type is implicitly transmitted based on the address used in the message/datagram. This approach uses the same address ranges across all devices, thereby allowing each recipient device to implicitly know the message type based on the address used in the address field.

Additionally, a recipient device on the bus 102 may combine the USID/GSID with the address in the message/datagram to identify the sender/originator device of the message/datagram and how to respond to it (e.g., different message types may have different responses). In one implementation, the application processor 112 may change the memory address mapping for all devices 104, 106, 108, and 110 by sending a command and new memory address mapping over the bus 102.

Figure 3:
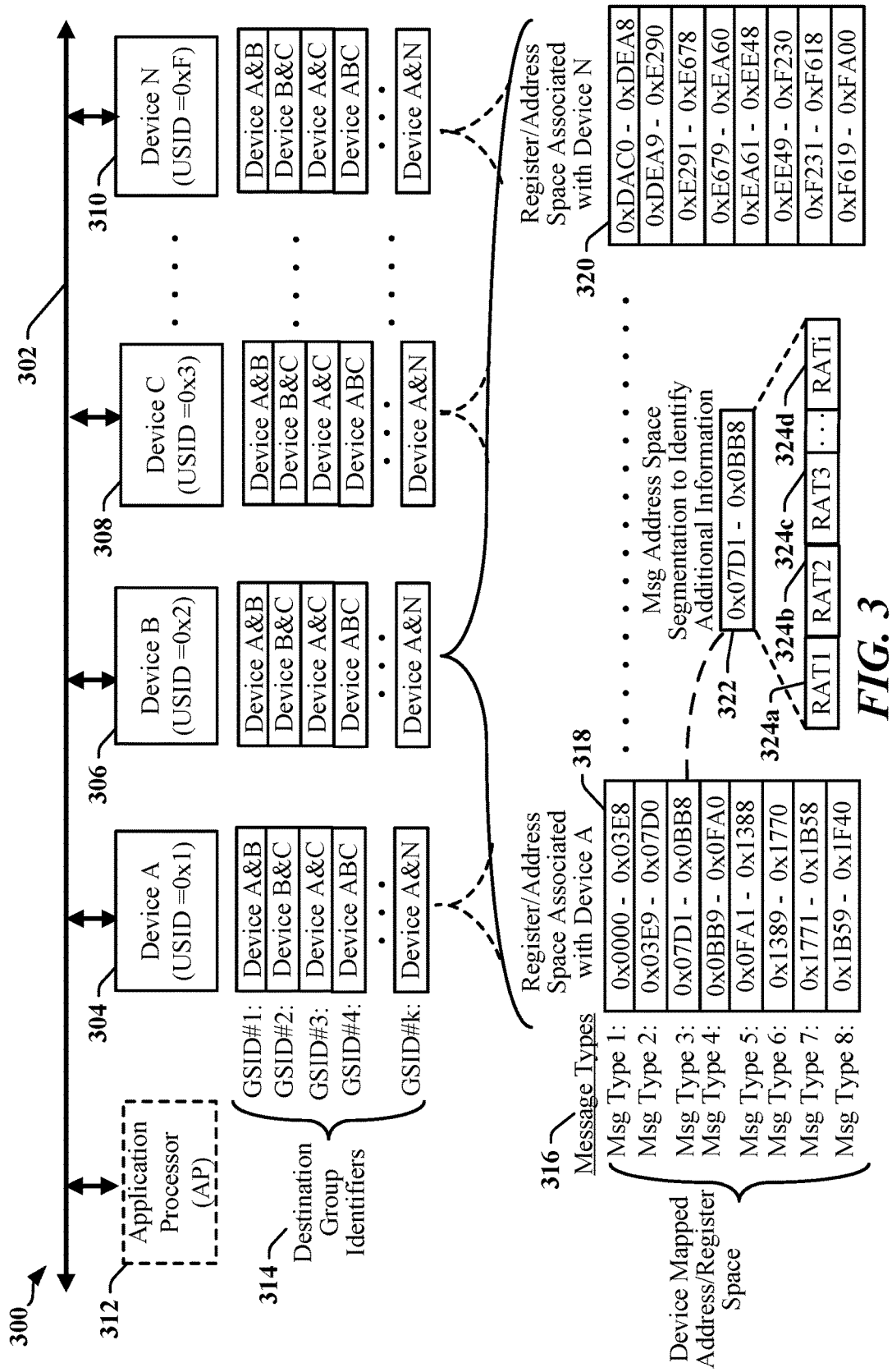
FIG. 3 illustrates an alternative exemplary device including a multi-drop serial bus and a plurality of devices coupled thereto.

FIG. 3 illustrates an alternative exemplary device 300 including a multi-drop serial bus and a plurality of devices coupled thereto. Similar to the device 100 of FIG. 1, a plurality of devices, 304, 306, 308, and 310 may be coupled to a serial bus 302 and may be configurable to operate as either a master device or a slave device when communicating over the multi-drop bus 302. Each device 304, 306, 308, and 310 may have a corresponding unit-specific identifier (USID) that may serve to identify and/or address such device over the serial bus 302. In various implementations, the multi-drop serial bus 302 may serve to implement I2C, I3C, SPMI, and/or RFFE signaling and/or communications between the plurality of devices 304, 306, 308, and/or 310. In some implementations, some of the devices 304, 306, 308, and 310 maybe request-capable slave devices that are able to request use of the serial bus 302 to initiate transmissions. An application processor 312 may manage, control, and/or communicate with the plurality of devices 304, 306, 308, 310 over the multi-drop serial bus 302.

In this alternative exemplary device 300, a plurality of unique group-specific identifiers 314 are defined, with each group-specific identifier identifying two or more devices on the serial bus 302 that are the intended recipients of a message/datagram. This plurality of unique group-specific identifiers 314 are distributed to all devices 304, 306, 308, and 310 on the serial bus 302. A particular sender device uses one of the unique group-specific identifiers in a destination field of a message/datagram to reach two or more intended devices on the serial bus 302. Upon receiving the message/datagram, each device on the serial bus 302 checks whether the destination field identifies its unit-specific identifier or a group-specific identifier in it is the intended recipient. If so, it processes the message/datagram. Otherwise, the message/datagram may be ignored. The use of group-specific identifiers reduces the number of messages that may need to be sent over the serial bus by reaching two or more intended recipient devices with a single message transmission rather than multiple message transmission.

For instance, a plurality of unique group-specific identifiers GSID#1, GSID#2, GSID#3, GSID#4, and GSID#k 314 may be defined and distributed to all devices on the serial bus 302. Each of the of the unique group-specific identifiers GSID#1, GSID#2, GSID#3, GSID#4, and GSID#k may be associated with a different/distinct combination of intended recipient devices. Such unique group-specific identifiers 314 may be distributed upon initialization, power-up, and/or reset of the device 300 or they may be distributed by a master device on the serial bus 302. Note that, in some implementations, the unique group-specific identifiers 314 may be dynamically generated and reconfigured by a master device and redistributed to all devices on the serial bus 302.

A message/datagram transmitted over the serial bus 302 may use, for example, a 4-bit identifier field to identify the intended recipient device but no identifier field may be defined to identify the sender device. Similarly, the message/datagram may not have a field to identify a message type.

Consequently, one aspect further provides for identifying a message type, message sender/originator device, and/or other information based on a register/address field used in the transmitted message/datagram. To reduce latency, rather than using additional bits in a message/datagram to identify this information, an address field (e.g., 16-bit address field) in the transmission/datagram may be used to map this information to an address or address range. For instance, in one example, each device in the serial bus 302 may be associated with a different (e.g., non-overlapping, distinct) register/address space 318 and 320. For instance, a first device 304 may be associated with a first address space/range 318 while a second device 310 may be associated with a second address space/range 320.

Additionally, each message type in a plurality of message types 316 may be mapped to particular register/address spaces within each of the register/address spaces. For instance, a first message type (e.g., Msg Type 1) may be associated with register/address space 0x000-0x03E8 (within the first register/address space 318) while the first message type is also associated with register/address space 0xDAC0-0xDEA8 (within the second register/address space 320).

These register/address spaces 318 and 320 for each device on the serial bus 302 are distributed to all other devices on the serial bus 320. Therefore, when the first device 304 sends a message/datagram of, for instance, message type 4, it uses an address/register in the 0x0BB9 to 0x0FA0 space in the register/address field in the message/datagram. Since all devices on the serial bus 302 know of the message type and device with which each register/address space is associated, such recipient devices are able to identify a message type and a sender/originator device based on the register/address identified in the address field of the message/datagram received.

Furthermore, other information may be encoded/mapped within a register/address space associated with a message type and device. For example, each of the message type register/address spaces may be further subdivided and mapped to convey other information. For instance, a register/address space 322 for some or all message types may be further mapped (e.g., subdivided) to correspond to different radio access technologies (RAT), RAT1 324a, RAT2 324b, RAT3 324c, and RATi 324d. That is, for the first register/address space 318 for Device A 304, RAT1 324a may be associated with address space 0x07D1-0x07FF, RAT2 324b may be associated with 0x0800-0x08DD, and so on. In some implementations, all register/address spaces for all message types may be subdivided and mapped in the same manner to convey the same information across all message types. Alternatively, register/address spaces for message types may be subdivided and mapped in different ways for different message types to convey different information across all message types.

Note that the selection of register/address spaces illustrated in FIG. 3 are merely exemplary and different register/address spaces (ranges) may be used.

Figure 4:
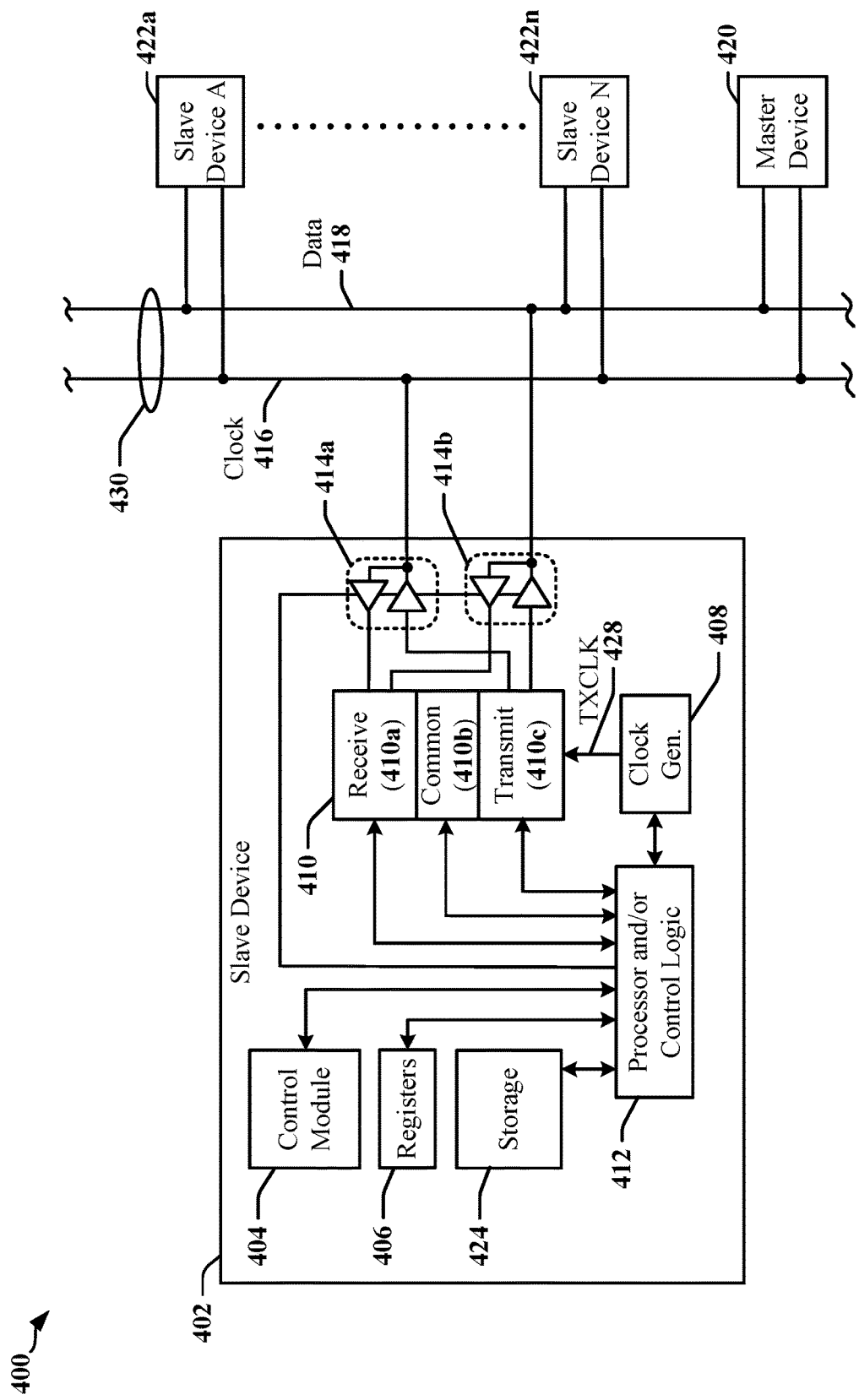
FIG. 4 illustrates another exemplary device that includes a plurality devices connected to a serial bus.

FIG. 4 illustrates another exemplary device 400 that includes a plurality devices 402, 420 and 422a-422n connected to a serial bus 430. The devices 402, 420 and 422a-422n may include one or more semiconductor IC devices, such as an applications processor, system on a chip (SoC) or application-specific integrated circuit (ASIC). Each of the devices 402, 420 and 422a-422n may include, support or operate as a modem, a signal processing device, a display driver, a camera, a user interface, a sensor, a sensor controller, a media player, a transceiver, and/or other such components or devices. Communications between devices 402, 420 and 422a-422n over the serial bus 430 is controlled by a bus master 420. Certain types of busses can support multiple bus masters 420.

The device 400 may include multiple devices 402, 420 and 422a-422n that communicate when the serial bus 430 is operated in accordance with an I2C, I3C, RFFE, SPMI or other protocol. At least one device 402, 422a-422n may be configured to operate as a slave device on the serial bus 430. In one example, a slave device 402 may be adapted to provide a control function 404. In some examples, the control function 404 may include circuits and modules that support a display, an image sensor, and/or circuits and modules that control and communicate with one or more sensors that measure environmental conditions. The slave device 402 may include configuration registers 406 or other storage 424, control logic 412, a transceiver 410 and line drivers/receivers 414a and 414b. The control logic 412 may include a processing circuit such as a state machine, sequencer, signal processor or general-purpose processor. The transceiver 410 may include a receiver 410a, a transmitter 410c and common circuits 410b, including timing, logic and storage circuits and/or devices. In one example, the transmitter 410c encodes and transmits data based on timing in one or more signals 428 provided by a clock generation circuit 408.

Two or more of the devices 402, 420 and/or 422a-422n may be adapted according to certain aspects and features disclosed herein to support a plurality of different communication protocols over a common bus, which may include an I2C, I3C, RFFE, SPMI and/or another protocol. In some instances, devices that use different protocols can coexist on the same serial bus 430. In one example, devices communicating using I2C protocols may coexist on a bus with devices that communicate according to I3C protocols. I3C protocols may support a mode of operation that provides a data rate between 6 megabits per second (Mbps) and 16 Mbps with one or more optional high-data-rate (HDR) modes of operation that provide higher performance, whereas I2C protocols conforming to de facto I2C standards provide for data rates that may range between 100 kilobits per second (kbps) and 3.2 Mbps.

I2C, I3C, RFFE, SPMI protocols may define electrical and timing aspects for signals transmitted on the serial bus 430, in addition to data formats and aspects of bus control. In some aspects, the protocols may define direct current (DC) characteristics affecting certain signal levels associated with the serial bus 430, and/or alternating current (AC) characteristics affecting certain timing aspects of signals transmitted on the serial bus 430. In some examples, a device 402, 420, 422a-422n coupled to 2-wire serial bus 430 transmits data on a first wire 418 in accordance with timing provided by a clock signal transmitted on a second wire 416. In some instances, data may be transmitted using the combined signaling state, and/or in transitions between signaling state of the first wire 418 and the second wire 416.

One or more aspects illustrated in FIGS. 1 and 2 may be implemented by the devices 402, 420, and/or 422a-422n and serial bus 430 within one or more protocols used over the serial bus 430. In particular, to reduce latency and improve efficiency over the serial bus, group-specific identifiers may be allocated/assigned to each device, such group-specific identifier allocations are distributed to all devices on the serial bus to allow them to inherently identify a sender/source of a message/datagram (i.e., without actually using a sender/originator device identifier in the message/datagram). Additionally, a plurality of message types are mapped to non-overlapping registers/addresses. These registers/addresses are then used in a message/datagram over the serial bus to inherently (but not explicitly) identify a message type.

Figure 5:
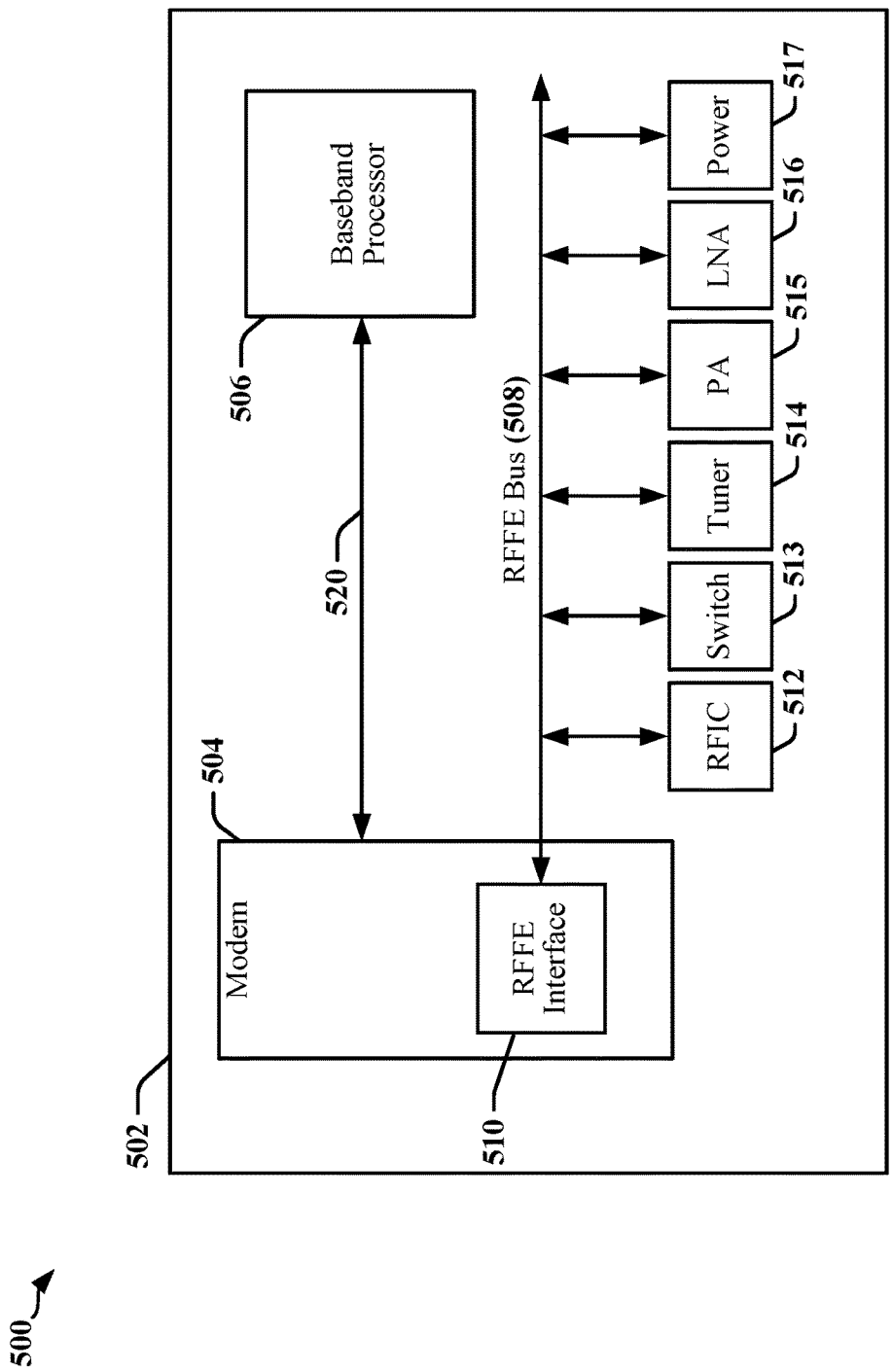
FIG. 5 is a block diagram illustrating an example of a device that employs an RFFE bus to couple various front-end devices.

FIG. 5 is a block diagram 500 illustrating an example of a device 502 that employs an RFFE, bus 508 to couple various front-end devices 512-517. A modem 504 may include an RFFE interface 510 that couples the modem 504 to the RFFE bus 508. The modem 504 may communicate with a baseband processor 506. The illustrated device 502 may be embodied in one or more of a mobile communication device, a mobile telephone, a mobile computing system, a mobile telephone, a notebook computer, a tablet computing device, a media player, a gaming device, a wearable computing and/or communications device, an appliance, or the like. In various examples, the device 502 may be implemented with one or more baseband processors 506, modems 504, multiple communications links 508, 520, and various other busses, devices and/or different functionalities. In the example illustrated in FIG. 5, the RFFE bus 508 may be coupled to an RF integrated circuit (RFIC) 512, which may include one or more controllers, and/or processors that configure and control certain aspects of the RF front-end. The RFFE, bus 508 may couple the RFIC 512 to a switch 513, an RF tuner 514, a power amplifier (PA) 515, a low noise amplifier (LNA) 516 and a power management module 517.

One or more aspects illustrated in FIGS. 1 and 2 may be implemented by the devices 504, 512, 513, 514, 515, 516, and/or 517 and serial bus 508 within one or more protocols used over the serial bus 508. In particular, to reduce latency and improve efficiency over the serial bus, group-specific identifiers may be allocated/assigned to each device, such group-specific identifier allocations are distributed to all devices on the serial bus to allow them to inherently identify a sender/source of a message/datagram (i.e., without actually using a sender/originator device identifier in the message/datagram). Additionally, a plurality of message types are mapped to non-overlapping registers/addresses. These registers/addresses are then used in a message/datagram over the serial bus to inherently (but not explicitly) identify a message type.

Exemplary Device and Methods Operational Thereon

Figure 6:
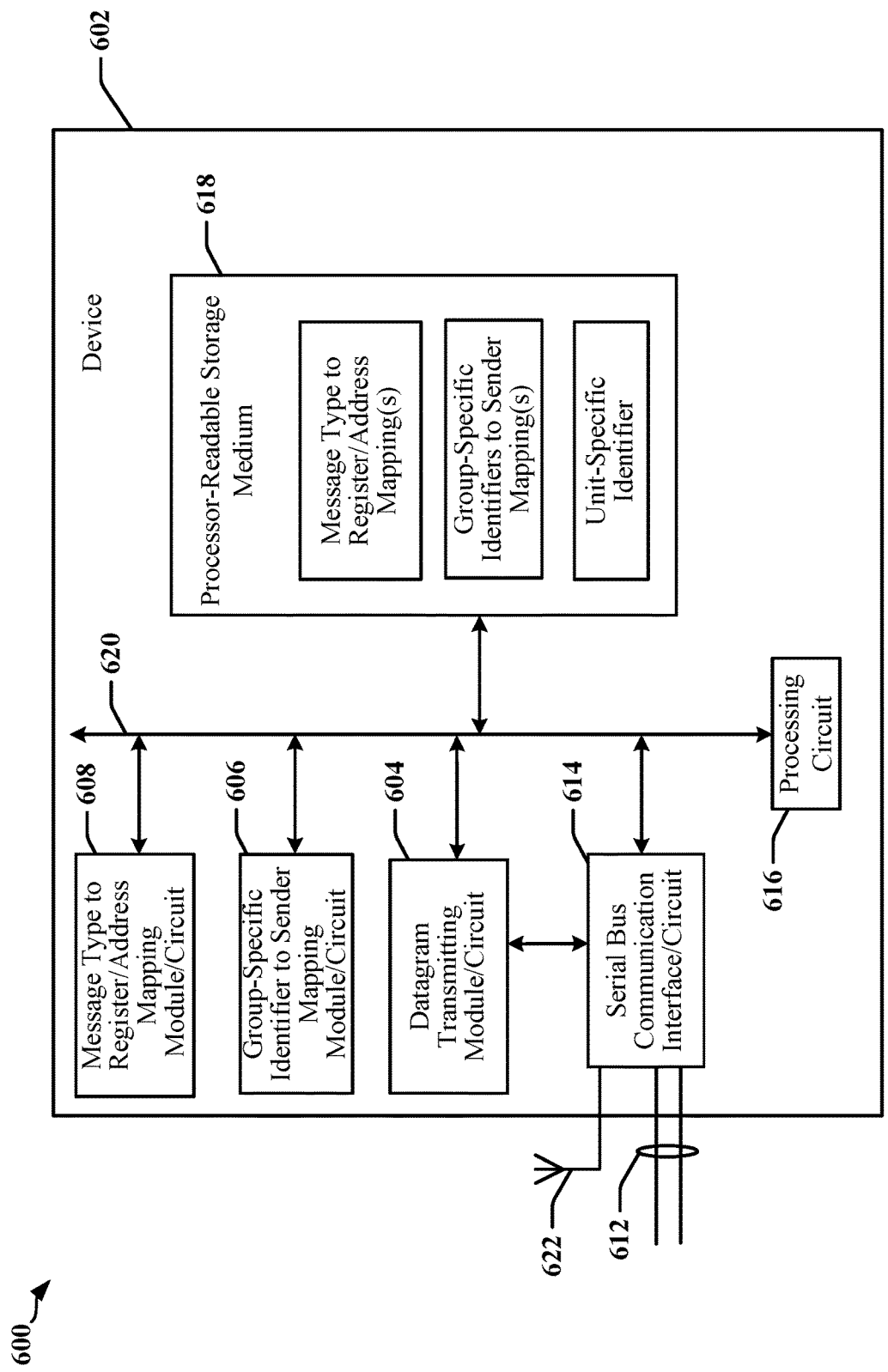
FIG. 6 is a diagram illustrating an exemplary device configured to perform one or more aspects described herein.

FIG. 6 is a diagram illustrating an exemplary device 600 configured to perform one or more aspects described herein. The device 600 may include a processing circuit 616 coupled, over a bus 620, to a processor-readable storage medium 618, a group-specific identifier to sender mapping module/circuit 606, a message type to register/address mapping module/circuit 608, a datagram transmitting module/circuit 604, and/or a serial bus communication interface/circuit 614.

The processing circuit 616 may be responsible for general processing, including the execution of software, code and/or instructions stored on the processor-readable storage medium 618. The processor-readable storage medium 618 may include a non-transitory storage medium. The software, when executed by the processor 616, causes the device 602 to perform the various functions described herein. The processor-readable storage medium 618 may be used for storing data that is manipulated by the processing circuit 616 when executing software.

Figure 7:
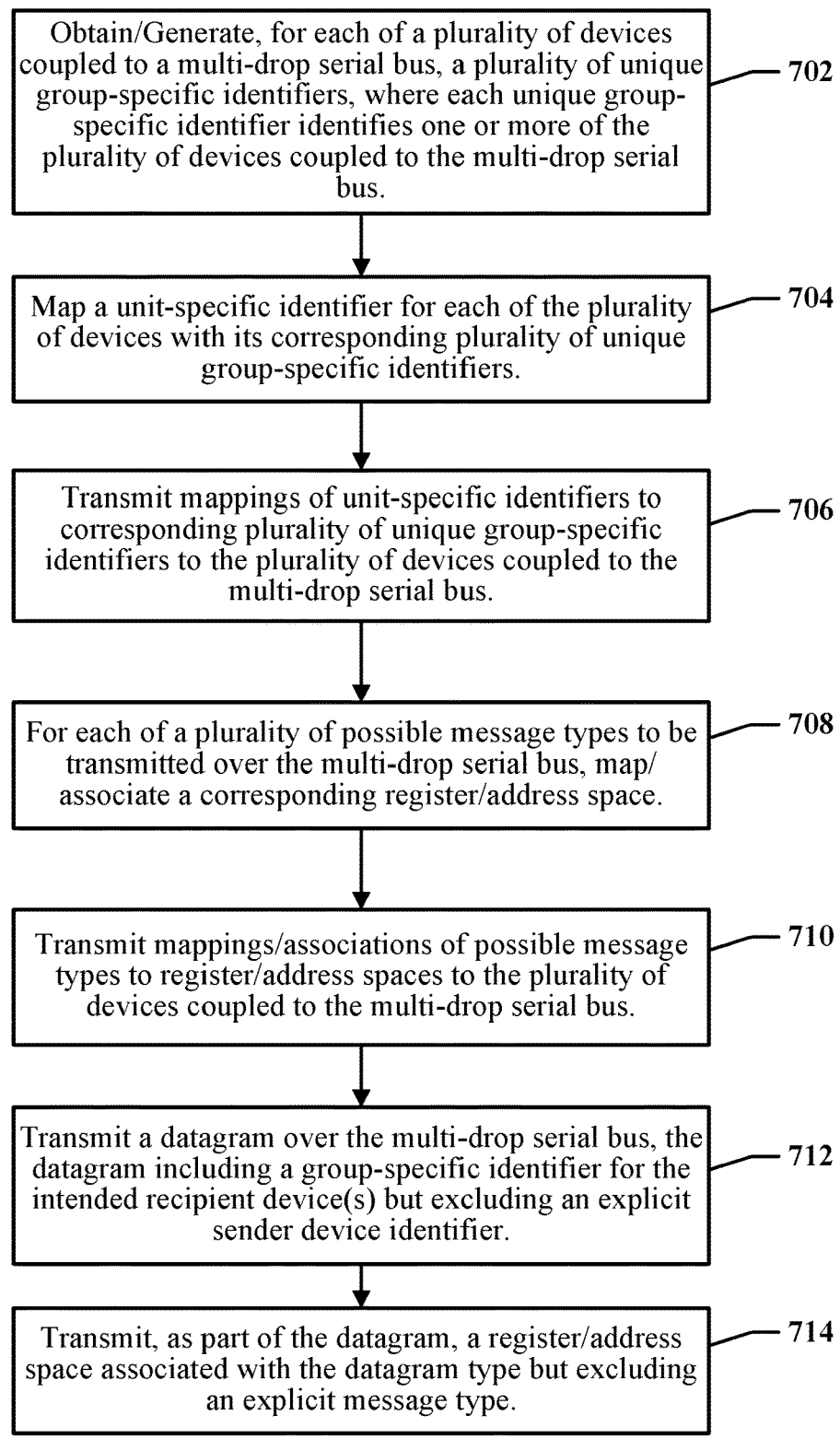
FIG. 7 illustrates a first exemplary method that may be performed at a device to efficiently communicate over a multi-drop serial bus.

FIG. 7 illustrates a first exemplary method that may be performed at a device to efficiently communicate over a multi-drop serial bus. In this method, the device of FIG. 6 may operate as a master device over the serial bus and may implement one or more aspects illustrated in FIGS. 1 and 2. For each of a plurality of devices coupled to a multi-drop serial bus, a plurality of unique group-specific identifiers is obtained/generated, where each unique group-specific identifier identifies one or more of the plurality of devices coupled to the serial bus 702. A unit-specific identifier may be mapped/associated for each of the plurality of devices with its corresponding plurality of unique group-specific identifiers 704. Mappings of unit-specific identifiers to corresponding plurality of unique group-specific identifiers may be transmitted to the plurality of devices coupled to the multi-drop serial bus 706. For each of a plurality of possible message types to be transmitted over the multi-drop serial bus, a corresponding register/address space may also be mapped/associated 708. The mappings/associations of possible message types to register/address spaces may also be transmitted to the plurality of devices coupled to the serial bus 710.

Subsequently, the device may transmit a datagram over the multi-drop serial bus, the datagram including a group-specific identifier for the intended recipient device(s) but excluding an explicit sender device identifier 712. Additionally, the device may transmit, as part of the datagram, a register/address space associated with the datagram type but excluding an explicit message type 714.

Figure 8:
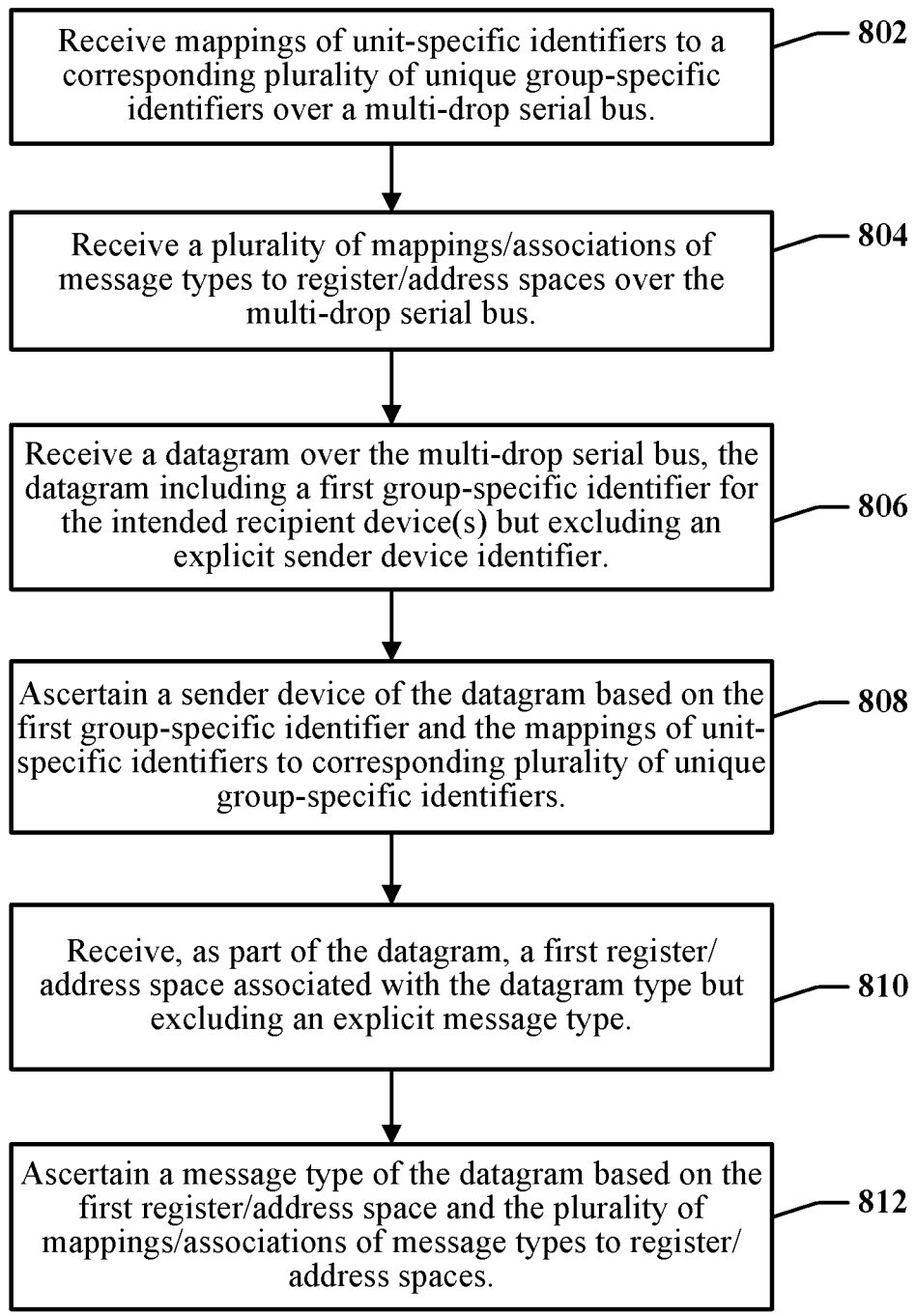
FIG. 8 illustrates a second exemplary method that may be performed at a device to efficiently communicate over a multi-drop serial bus.

FIG. 8 illustrates a second exemplary method that may be performed at a device to efficiently communicate over a multi-drop serial bus. In this method, the device of FIG. 6 may operate as a slave device over the multi-drop serial bus and may implement one or more aspects illustrated in FIGS. 1 and 2. The device may receive mappings of unit-specific identifiers to a corresponding plurality of unique group-specific identifiers over the serial bus 802. Additionally, the device may receive a plurality of mappings/associations of message types to register/address spaces over the serial bus 804.

Subsequently, a datagram may be received over the serial bus, the datagram including a first group-specific identifier for the intended recipient device(s) but excluding an explicit sender device identifier 806. The device may ascertain a sender device of the datagram based on the first group-specific identifier and the mappings of unit-specific identifiers to corresponding plurality of unique group-specific identifiers 808.

The device may also receive, as part of the datagram, a first register/address space associated with the datagram type but excluding an explicit message type 810. A message type of the datagram may be ascertained based on the first register/address space and the plurality of mappings/associations of message types to register/address spaces 812.

Figure 9:
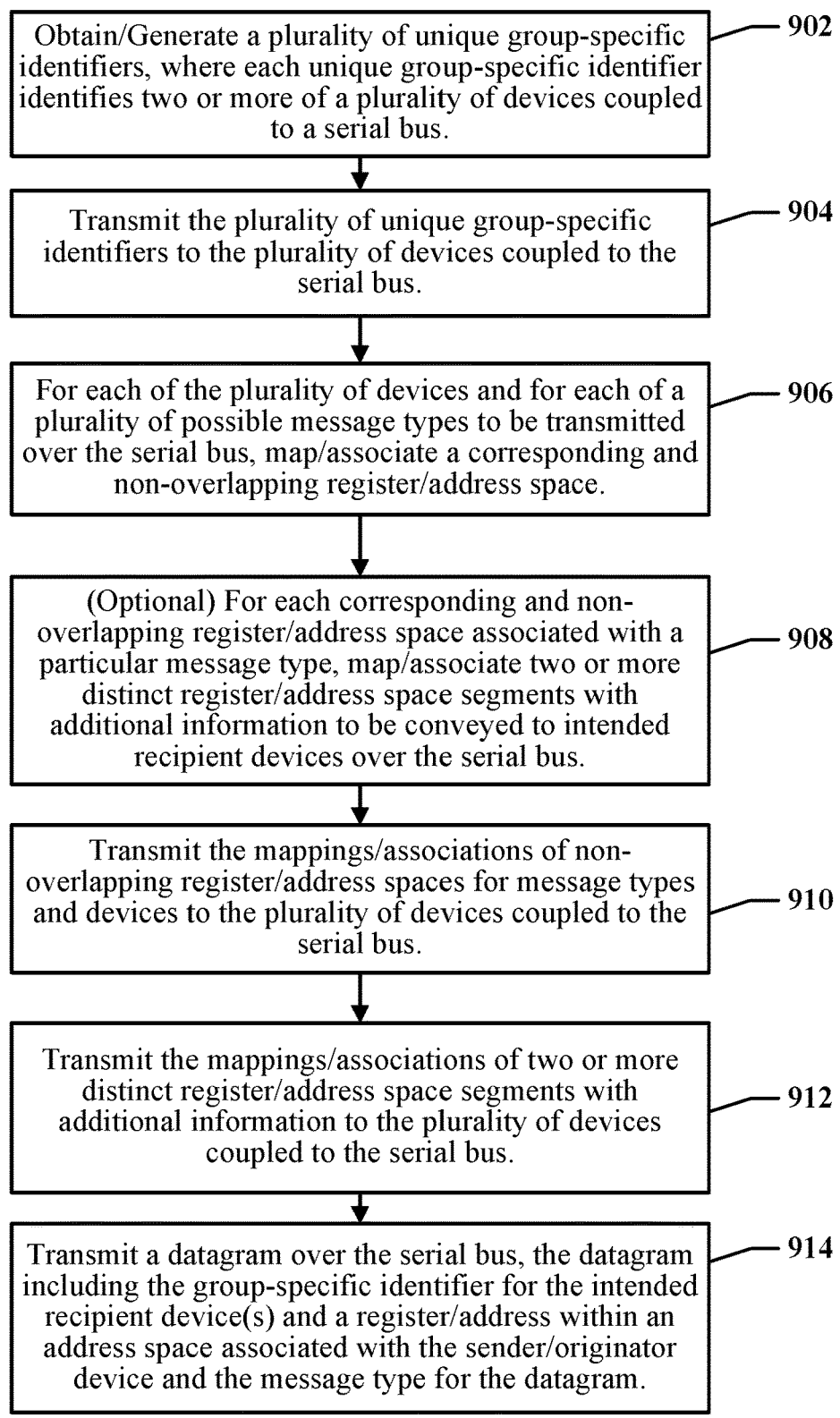
FIG. 9 illustrates a third exemplary method that may be performed at a device to efficiently communicate over a multi-drop serial bus.

FIG. 9 illustrates a third exemplary method that may be performed at a device to efficiently communicate over a multi-drop serial bus. In this method, the device of FIG. 6 may operate as a master device over the serial bus and may implement one or more aspects illustrated in FIG. 3. A plurality of unique group-specific identifiers may be obtained/generated, where each unique group-specific identifier identifies two or more of a plurality of devices coupled to a serial bus 902. The plurality of unique group-specific identifiers may be transmitted to the plurality of devices coupled to the serial bus 904.

For each of the plurality of devices and for each of a plurality of possible message types to be transmitted over the serial bus, a corresponding and non-overlapping register/address space is mapped or associated 906. For each corresponding and non-overlapping register/address space associated with a particular message type, two or more distinct register/address space segments are mapped/associated with additional information to be conveyed to intended recipient devices over the serial bus 908.

The mappings/associations of non-overlapping register/address spaces for message types and devices are transmitted to the plurality of devices coupled to the serial bus 910. The mappings/associations of two or more distinct register/address space segments with additional information may also be transmitted to the plurality of devices coupled to the serial bus 912.

A datagram may be transmitted over the serial bus, the datagram including the group-specific identifier for the intended recipient device(s) and a register/address within an address space associated with the sender/originator device and the message type for the datagram 914.

Figure 10:
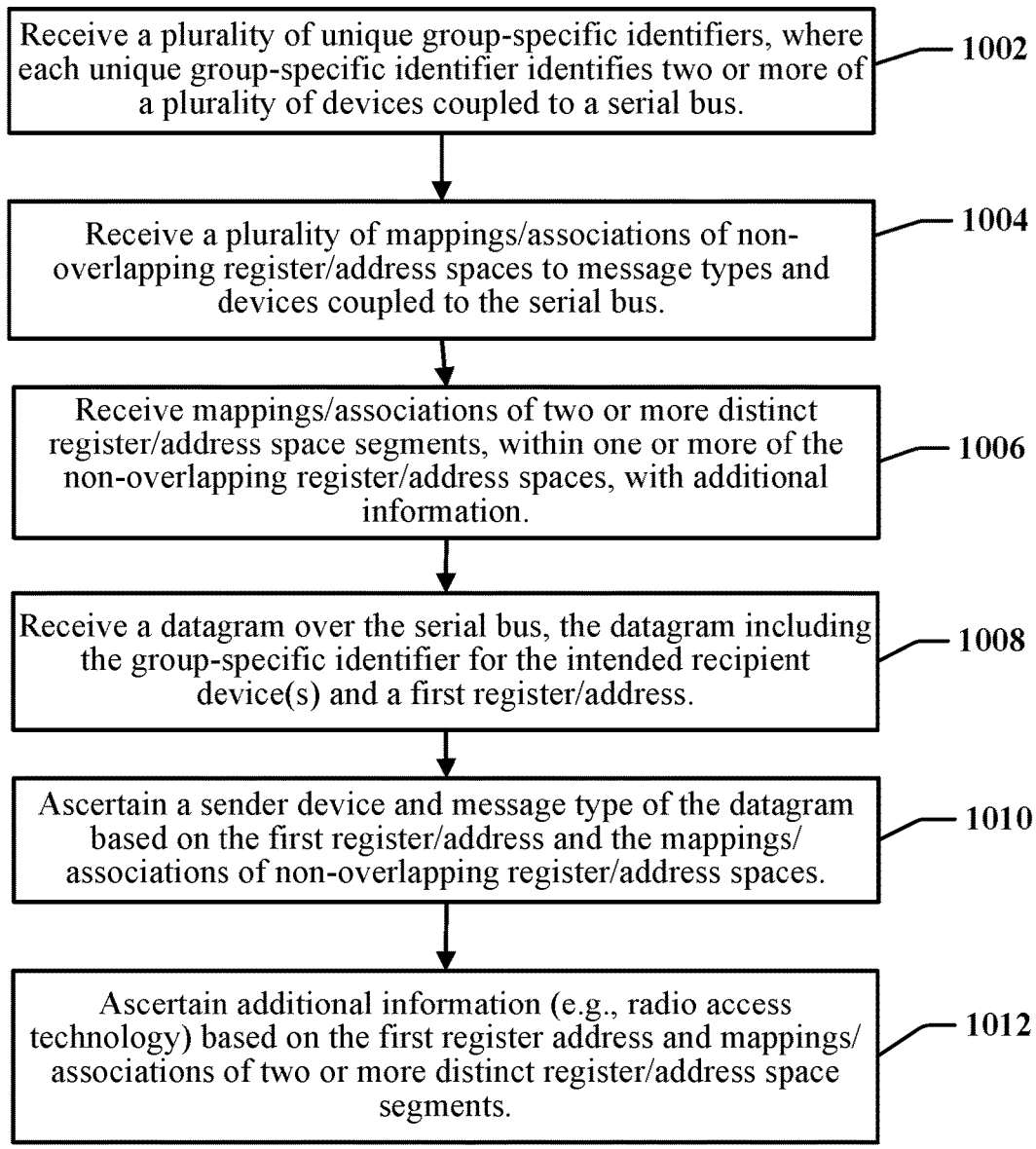
FIG. 10 illustrates a fourth exemplary method that may be performed at a device to efficiently communicate over a multi-drop serial bus.

FIG. 10 illustrates a fourth exemplary method that may be performed at a device to efficiently communicate over a multi-drop serial bus. In this method, the device of FIG. 6 may operate as a slave device over the serial bus and may implement one or more aspects illustrated in FIG. 3. A plurality of unique group-specific identifiers may be received by the device, where each unique group-specific identifier identifies two or more of a plurality of devices coupled to a serial bus 1002. A plurality of mappings/associations of non-overlapping register/address spaces to message types and devices coupled to the serial bus may also be received 1004. Additionally, mappings/associations of two or more distinct register/address space segments, within one or more of the non-overlapping register/address spaces, with additional information may be received 1006.

A datagram may be received over the serial bus, the datagram including the group-specific identifier for the intended recipient device(s) and a first register/address 1008. A sender device and message type of the datagram may be ascertained based on the first register/address and the mappings/associations of non-overlapping register/address spaces 1010. Additional information (e.g., radio access technology) may also be ascertained based on the first register address and mappings/associations of two or more distinct register/address space segments 1012.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method operational on a device coupled to a multi-drop serial bus, comprising:
    obtaining, for each of a plurality of devices coupled to the multi-drop serial bus, a plurality of unique group-specific identifiers, where each unique group-specific identifier identifies one or more of the plurality of devices coupled to the multi-drop serial bus;
    mapping a unit-specific identifier for each of the plurality of devices with its corresponding plurality of unique group-specific identifiers;
    transmitting mappings of unit-specific identifiers to corresponding plurality of unique group-specific identifiers to the plurality of devices coupled to the multi-drop serial bus; and
    transmitting a datagram over the multi-drop serial bus, the datagram including a group-specific identifier for an intended recipient device but excluding an explicit sender device identifier.

2. The method of claim 1, further comprising:
    mapping a corresponding register/address space for each of a plurality of possible message types to be transmitted over the multi-drop serial bus; and transmitting mappings of possible message types to register/address spaces to the plurality of devices coupled to the multi-drop serial bus.

3. The method of claim 2, further comprising:
transmitting, as part of the datagram, a register/address space associated with a datagram type but excluding an explicit message type.

4. The method of claim 2, wherein the register/address space is also uniquely mapped for each of the plurality of devices.

5. The method of claim 4, wherein the register/address space for each of the plurality of devices and each of the plurality of possible message types are non-overlapping for the plurality of devices.

6. The method of claim 1, wherein the multi-drop serial bus is a two line bus, including a clock line and a data line.

7. The method of claim 1, wherein the device performs an arbitration proceeding with other devices coupled to the multi-drop serial bus to be able to transmit the datagram over the multi-drop serial bus.

8. The method of claim 7, wherein the multi-drop serial bus is a multi-master serial bus.

9. A device, comprising:
a serial communication bus interface to couple to a serial bus; and
a processing circuit coupled to the serial communication bus interface, the processing circuit configured to
obtain, for each of a plurality of devices coupled to the serial bus, a plurality of unique group-specific identifiers, where each unique group-specific identifier identifies one or more of the plurality of devices coupled to the serial bus;
map a unit-specific identifier for each of the plurality of devices with its corresponding plurality of unique group-specific identifiers;
transmit mappings of unit-specific identifiers to corresponding plurality of unique group-specific identifiers to the plurality of devices coupled to the serial bus; and
transmit a datagram over the serial bus, the datagram including a group-specific identifier for an intended recipient device but excluding an explicit sender device identifier.

10. The device of claim 9, wherein the processing circuit is further configured to:
map a corresponding register/address space for each of a plurality of possible message types to be transmitted over the serial bus; and
transmit mappings of possible message types to register/address spaces to the plurality of devices coupled to the serial bus.

11. The device of claim 10, wherein the processing circuit is further configured to:
transmit, as part of the datagram, a register/address space associated with a datagram type but excluding an explicit message type.

12. The device of claim 10, wherein the register/address space is also uniquely mapped for each of the plurality of devices.

13. The device of claim 12, wherein the register/address space for each of the plurality of devices and each of the plurality of possible message types are non-overlapping for the plurality of devices.

14. The device of claim 9, wherein the serial bus is a two line bus, including a clock line and a data line.

15. The device of claim 9, wherein the device performs an arbitration proceeding with other devices coupled to the serial bus to be able to transmit the datagram over the serial bus.

16. The device of claim 9, wherein the serial bus is a multi-master serial bus.

17. A method operational on a device coupled to a multi-drop serial bus, comprising:
receiving mappings of unit-specific identifiers to a corresponding plurality of unique group-specific identifiers over the multi-drop serial bus;
receiving a datagram over the multi-drop serial bus, the datagram including a first group-specific identifier for an intended recipient device but excluding an explicit sender device identifier; and
ascertaining a sender device of the datagram based on the first group-specific identifier and the mappings of unit-specific identifiers to the corresponding plurality of unique group-specific identifiers.

18. The method of claim 17, further comprising:
receiving a plurality of mappings/associations of message types to register/address spaces over the multi-drop serial bus;
receiving, as part of the datagram, a first register/address space associated with a datagram type but excluding an explicit message type; and
ascertaining a message type of the datagram based on the first register/address space and the plurality of mappings/associations of message types to register/address spaces.

19. The method of claim 17, wherein the multi-drop serial bus is a two line bus, including a clock line and a data line.

20. The method of claim 17, wherein the multi-drop serial bus is a multi-master serial bus.

21. A device, comprising:
a serial communication bus interface to couple to a serial bus; and
a processing circuit coupled to the serial communication bus interface, the processing circuit configured to
receive mappings of unit-specific identifiers to a corresponding plurality of unique group-specific identifiers over the serial bus;
receive a datagram over the serial bus, the datagram including a first group-specific identifier for an intended recipient device but excluding an explicit sender device identifier; and
ascertain a sender device of the datagram based on the first group-specific identifier and the mappings of unit-specific identifiers to the corresponding plurality of unique group-specific identifiers.

22. The device of claim 21, wherein the processing circuit is further configured to:
receive a plurality of mappings/associations of message types to register/address spaces over the serial bus;
receive, as part of the datagram, a first register/address space associated with a datagram type but excluding an explicit message type; and
ascertain a message type of the datagram based on the first register/address space and the plurality of mappings/associations of message types to register/address spaces.

23. The device of claim 21, wherein the serial bus is a two line bus, including a clock line and a data line.

* * * * *